May 20, 1958  D. B. GALES  2,835,053
EDUCATIONAL DEVICE
Filed Oct. 18, 1954  2 Sheets-Sheet 1

DOLORES B. GALES
INVENTOR
HUEBNER, BEEHLER,
WORREL & HERZIG
ATTORNEYS
BY Richard M. Worrel May 20, 1958 D. B. GALES 2,835,053
EDUCATIONAL DEVICE
Filed Oct. 18, 1954 2 Sheets-Sheet 2

DOLORES B. GALES
INVENTOR
HUEBNER, BEEHLER,
WORREL & HERZIG
ATTORNEYS

United States Patent Office

2,835,053
Patented May 20, 1958

2,835,053

EDUCATIONAL DEVICE

Dolores B. Gales, Fresno, Calif.

Application October 18, 1954, Serial No. 462,756

9 Claims. (Cl. 35—73)

The present invention relates to educational devices and more particularly to those based upon pupil and/or instructor selection and ordered arrangement of movable members displaying visual clues to such selection and arrangement.

The gaining and retention of pupil interest and attention have long been recognized as essentials to effective teaching. Inasmuch as teaching is fundamentally the stimulation and guiding of pupil learning, it is observed that no matter how educationally qualified, inspired or devoted the teacher may be, his success can be no greater than his ability to obtain effective pupil participation in learning experiences. Actually, the teacher is limited to a manipulation of those portions of the pupils' environment which may be caused to impress upon the pupils' senses stimuli sufficient to induce mental reaction or other participation in a learning experience. Too frequently, particularly in large classes, appeal is made only to the senses of hearing, by oral explanation, or sight, by visual demonstration. While such techniques may be adequate for mature students accustomed to mental self-discipline, they are markedly ineffective for those lacking such self discipline, particularly young children whose interest span is notably short. It has been found that far more effective results can be obtained if the pupils are permitted to coordinate certain physical reactions or manipulations with such sensory impressions as are gained by hearing and/or seeing. This is particularly true of children.

A primary object of the present invention is, therefore, to provide an educational device which permits the pupil to register response by physical reactions or manipulations coordinate with visual sensory impressions.

Another object is to provide such a device which is suited to the provision of such independent supplemental auditory sensory impressions as the instructor may wish to provide.

Another object is to provide an educational device of the character described which is adaptable to a wide range of subject matter.

Another object is to provide an educational aid usable in the manner of flash cards, for matching exercises, for segregation practice, for problem presentation and solution indication, for eye span training, for simple judgment training, for reading practice and vocabulary drill, for arithmetic exercises, for emphasizing proper grammatical relationships and usages, for spelling presentation, and for the teaching of other skills and knowledges.

Another object is to provide a device of the type discussed which may be quickly and easily adapted to varied educational purposes.

Further objects are to provide an educational aid suited to pupil manipulation which is simple in structure, economical and conducive to the obtaining of pupil attention.

Additional objects and advantages will become apparent in the subsequent description in the specification.

Figure 1:
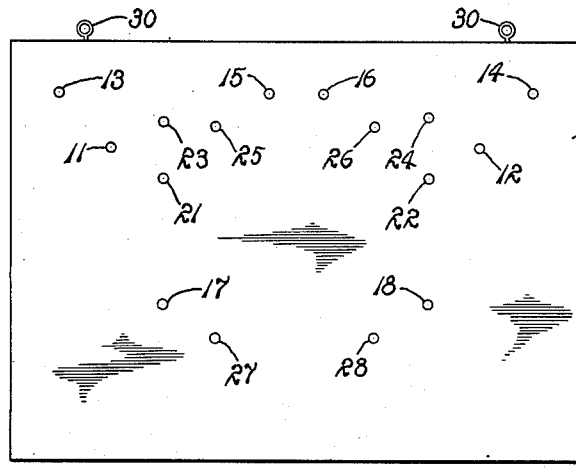
Fig. 1 is a front elevation of a panel employed in the device of the present invention illustrating a suitable form thereof.

Referring in greater detail to the drawings:

A substantially rectangular panel is indicated generally at 10 of any suitable material, such as plywood, fiberboard, metal, plastic, cardboard, or the like. Although the panel is illustrated as rectangular in form, it may be provided in any other shape desired. Pivot pin openings or bores 11, 12, 13, 14, 15, 16, 17 and 18 are provided in the panel in an arrangement and spacing subsequently defined. Each of the pivot pin bores has a companion peg bore or opening laterally adjacent and downwardly spaced therefrom. These peg bores are designated 21, 22, 23, 24, 25, 26, 27 and 28, respectively. Inasmuch as the panel 10 is usually employed in an erect position, it is found convenient to provide eyelets 30 along the upper edge thereof whereby convenient pendant support of the panel can be provided. The panel is also frequently employed in a substantially erect position supported in the chalk molding of a blackboard, rested on a chair, and in other convenient positions.

Headed bolts 40 are frictionally fitted to the pivot pin bores 11 to 18. The bolts constitute a convenient form of pivot pin and have screw-threaded end portions adapted to receive wing nuts 41.

Pegs 45 are frictionally fitted to the peg bores 21 to 28. The pegs are conveniently formed of doweling and preferably provide upwardly disposed flats 46, for purposes soon to become apparent, inwardly spaced from the outer ends thereof.

Figure 2:
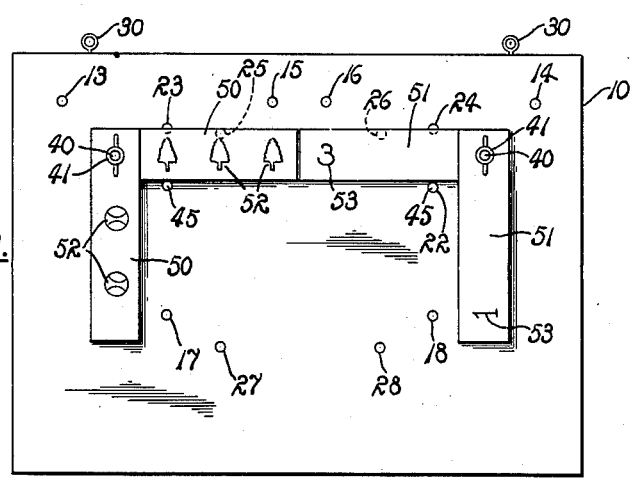
Fig. 2 is a front elevation of the panel shown in Fig. 1 having books of tablet members mounted thereon for use in teaching.
Figure 3:
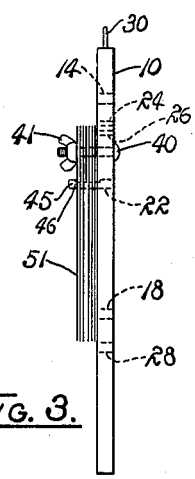
Fig. 3 is an edge elevation of the structure shown in Fig. 2, as viewed from the right side thereof.

In the form of the device shown in Figs. 2 and 3, pivot pins 40 are located in the bores 11 and 12 and pegs 45 located in their respective companion bores 21 and 22. A book of substantially rectangular congruent tablets 50 is pivotally supported on the pivot pin in the bore 11 in pendant position thereon. A jointly employed book of similar tablet members 51 is pivotally supported on the pin in the bore 12 in pendant position thereon. The tablets 50 have a variety of visual indicia 52 thereon and the tablets 51 have visual indicia 53. Tablet members on each of the pins bear visual indicia which relate to a common learning exercise. For example for use in the lower primary grades, one of the tablets 50 shows three trees and its companion tablet 51 bears the numeral 3. In use, the teacher may select a tablet 50 showing a given number of objects, such as trees, automobiles, houses, etc. and pivot the tablet about its pin 40 to the horizontal position rested on the peg 45 adjacent thereto. The student thereupon selects the tablet 51 bearing the numeral indicating the number of objects on the panel 50 and pivots it about its pin 40 into the horizontal position rested on the adjacent peg 45. Although the flats 46 on the pegs are not required, they are preferably provided and the pegs arranged so the flats are upwardly disposed. This provides a greater resting surface for the tablets and minimizes wear to the edges of the tablets. By terminating the flats short of the outer ends of the pegs, the cylindrical forms of the pegs at the ends constitute stops resistive to inadvertent displacement of the tablet members. The spacing of the bores 11 and 12 is such in relation to the lengths of the tablets that the horizontal tablets 50 and 51 are aligned and endwardly adjacent. The wing nuts 41 are screw-threadably mounted on the forward ends of the pins and serve to maintain the tablets on their respective pins during teacher and/or pupil manipulation.

The illustrated exercise is obviously for the purpose of teaching number concepts. The tablets may be of cardboard, plastic, wood, or any other suitable material and it is found that teachers frequently provide their own visual indicia on the tablets in accordance with particular teaching objectives. For example, in order to teach number-word concepts, tablets 50 may be provided with numerals and the tablets 51 with corresponding number designating words. Arithmetic problems may be provided on the tablets 50 and appropriate answers on the tablet 51. Color identification can be taught by coloring one set of tablets a variety of colors and providing the appropriate names of the colors on the other set of atblets. Detection of beginning and end sounds and letter identification can be practiced by designating all but the corresponding end letters of words on one set of tablets and providing the missing end letters in random order on the other set of tablets. A similar arrangement can serve to give the pupil practice in the making of different words by changing either initial or terminal letters. To develop speed in reading by rapid recognition of phases, portions of the phases are provided on one set of the tablets and the remaining portions thereof on the opposite tablets. By swinging the tablets into horizontal position so as to complete a given phrase, the pupils may be given practice in prompt and competitive recognition. To assist in identification of rhyming words, a set of words is provided on the tablets 50 and words which rhyme therewith on the tablets 51. Demonstration of the formation of compound words from separate words can be made by representing words on the tablets 50 which can be combined with words represented on the tablets 51 to form compound words. In all instances, the tablets are mounted on the pivot pins in shuffled order so that the pupil must exercise his powers of selection. It will be noted that each of the tablet members has visual indicia thereon which is unique thereto but that there are companion tablets on the different pins whose visual indicia relate to a single visual entity or representation. The expressions "visual entity" and "single visual representation" in this connection are intended to include the indicia on the different tablets which when properly associated are readable as a unit, complete a given matching relationship, or otherwise represent a completed learning exercise. The visual indicia on the individual tablets relating to a common visual entity constitute differential integrants of the entity. The entity is disorganized when the tablets are in retracted positions and is restored when the companion tablets are selected from their respective books and pivoted to display positions.

Innumerable learning experiences which can be advantageously presented by the form of the device shown in Fig. 2 other than those suggested will readily occur to anyone skilled in teaching. It is sufficient at this point to observe that in classroom use it has been found of advantage in the teaching of nearly all skills and knowledges with which the primary grades are concerned.

Figure 4:
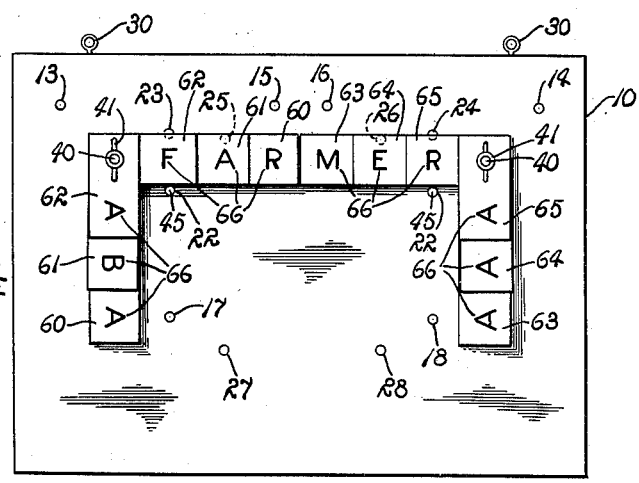
Fig. 4 is a front elevation of the panel shown in Fig. 1 employing books of tablet members dissimilar to those shown in Fig. 2 and designed for a different learning exercise.
Figure 5:
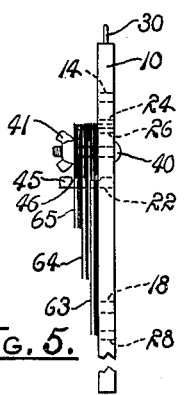
Fig. 5 is an edge elevation of the structure shown in Fig. 4 viewed from the right side thereof.

To employ the device as represented in Fig. 4, the pins 40 and pegs 45 are inserted in the same arrangement and bores as shown in Fig. 2. However, in this instance a plurality of books of tablets, indicated at 60, 61 and 62, respectively, are mounted on the left pin, as viewed, and tablets 63, 64 and 65 mounted on the right pin. Although the tablets are rectangular and preferably of the same width, they are of different length and are mounted on their pins so that the books outwardly from the panel 10 are of progressively substantially equally shorter length. Thus tablets 60 and 63 are of the same length, as are 61 and 64, and 62 and 65. Tablets 60 and 63 are of such length that they substantially meet when pivoted to horizontal positions.

Although the tablets 60 to 65 may also have innumerable forms of indicia 66 thereon suited to varied learning exercises, the utility of the form of the invention shown in Fig. 4 is readily demonstrated by the designation of letters of the alphabet on each of the tablets in positions readable when their tablets are horizontally disposed. Thus, if the pupil desires to spell "farmer," he selects an "f" from the book 62 and pivots the tablet on which the "f" is found into horizontal position rested on the peg in bore 21. Next he selects a tablet bearing the letter "a" from the book 61 and pivots that tablet into horizontal position. Inasmuch as the tablets of book 61 are longer than the tablets of book 62 and are located therebehind, the "a" is automatically presented in reading relation to the "f" of tablet 62. Similarly an "r" is selected from the book 60 and arranged with its tablet in horizontal position. The "m" is provided by selecting the appropriate tablet from book 63 and pivoting the tablet into horizontal position rested on the peg in bore 22. In the same manner the "e" and the "r" are selected and positioned from books 64 and 65.

In Figs. 2 to 5, both inclusive, the tablets are in retracted position when pendant and in display, or associated, position when pivoted upwardly to horizontal position. It will be apparent that the tablets at the left of Figs. 2 and 4 are pivoted counterclockwise from retracted to display positions and the tablets at the right thereof pivoted clockwise during such movement. When it is desired to display tablets which on their respective pins are forwardly of tablets previously displayed, they are simply pivoted to display position. If the tablets it is desired to display are rearwardly of tablets previously displayed, the previously displayed tablets are returned to retracted position so that the subsequent tablets can be viewed in display position.

During the employment of the device for educational purposes, it frequently becomes desirable to rearrange the books of tablets and their respective retracted and display positions for adaptation to different learning exercises and/or to provide a greater visual variety conducive to sustained pupil interest. Additional tablets and arrangements thereof are demonstrated in Figs. 6, 7 and 8.

Figure 6:
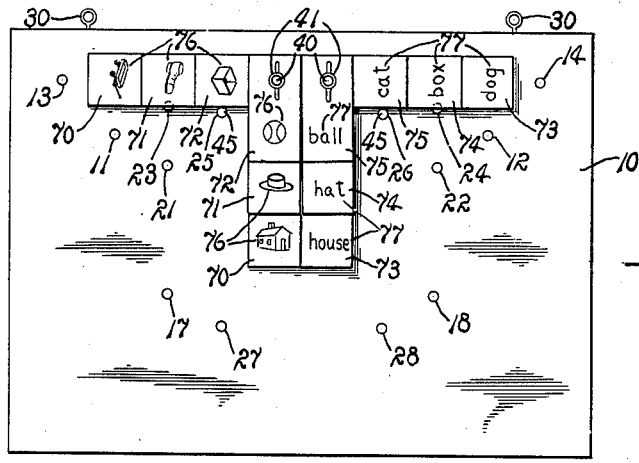
Fig. 6, 7 and 8 are front elevations of the educational device illustrating the employment of further sets of tablet members in differing illustrative learning exercises.

Referring particularly to Fig. 6, it will be observed that the pivot pins 40 are placed in the bores 15 and 16 and the pegs 45 in the bores 25 and 26. A plurality of books 70, 71 and 72 of tablets are pivotally mounted on the left pin 40 and rested on its laterally adjacent peg 45 in horizontal position. Similarly, a plurality of books 73, 74 and 75 are pivotally mounted on the right pin 40 and rested on the peg 45 adjacent thereto. Like the books 60 to 65, the tablets within each of the books 70 to 75 are of equal length but the tablets of the different books of progressively shorter length outwardly from the panel 10. For word recognition purposes, the tablets 70, 71 and 72 are provided with visual indicia 76 such as a house, a hat, a ball, a chair, a pencil, a table and the like. The tablets 73, 74 and 75 have visual indicia 77, consisting of the names of objects shown at 76, displayed in books corresponding to the books of the indicia 76 so that the words may be brought into juxtaposition with the objects named thereby.

In use for example, a tablet from the book 70 showing a house is pivoted over the peg 45 into pendant position. The pupil then selects the tablet from the book 73 on which "house" is written and pivots that tablet downwardly over the peg 45 so that the word is brought into position adjacent to the visual representation of the house. If preferred, the tablets, which are normally somewhat flexible, may be pivoted in the opposite directions into pendant position. Similarly the instructor moves the tablet showing the hat from the book 71 into pendant position and the student selects the tablet bearing "hat" from book 74 and moves it into pendant position. As before, the use of the device in the arrangement shown in Fig. 6 is simply illustrative of a multiplicity of educational exercises that can be performed therewith.

Figure 7:
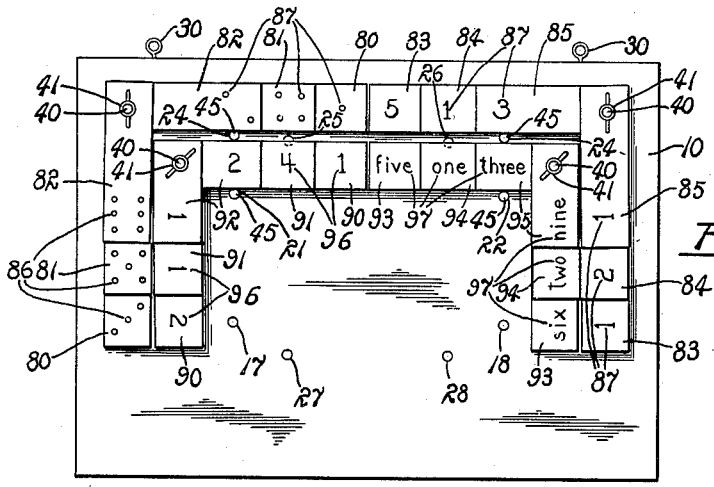

In Fig. 7, dual sets of books of tablets are cooperatively employed at opposite sides of the panel 10. For purposes of illustrative simplicity, the books at the left demonstrate pupil matching of predetermined numbers of dots with appropriate numerals and the books at the right demonstrate the matching of numbers with corresponding word designations of the numerals. For this purpose, pivot pins 40 are inserted into the bores 13 and 14 and 11 and 12. Pegs 45 are inserted into the respectively adjacent bores 23, 24, 21 and 22. A plurality of books 80, 81 and 82 are pivotally supported on the pin in the bore 13. A similar plurality of books 83, 84 and 85 of tablets are pivotally mounted on the pin in the bore 14. A plurality of books 90, 91 and 92 are mounted on the pin in the bore 11 and books 93, 94 and 95 on the pin in the bore 12. The books 90 to 95 are preferably of the same description as that given for the books 60 to 65 and 70 to 75, with the books outwardly from the panel 10 being of progressively shorter length. The books 80 to 85 are identical thereto except of sufficiently greater length that when supported on their relatively higher pivot pins the extended ends of their respective tablets are aligned with the ends of the tablets of the correspondingly adjacent books 90 to 95.

In the illustrated embodiment, the books 80 to 82 bear dots 86 arranged in varied patterns and in different amounts, the books 90 to 92 bear numerals 96 corresponding to the numbers of dots on the tablets of their respectively adjacent books 80 to 82. The books 83 to 85 bear numerals 87 and the books 93 to 95 word designations 97 of the numerals in the books 83 to 85.

In use, the instructor may move selected tablets of the books 80 to 82 into the horizontal positions rested on the peg in the bore 23. The pupil then sorts the appropriate tablets from the books 90 to 92 and pivots them into horizontal position rested on the peg in the bore 21, the object being for the pupil properly to select the numerical designation 96 for the dots 86 appearing on the tablets selected by the instructor. Similarly, the instructor may pivot selected tablets from the books 93 to 95 into horizontal position rested on the peg in the bore 22. Whereupon the pupil selects appropriate corresponding tablets from the books 83 to 85 and pivots the selected tablets into horizontal position on the peg in the bore 24 so that the proper words 97 are matched with the selected numerals 87.

The device as shown in Fig. 7 is also excellently suited to spelling, phrasing, reading and other practices.

Figure 8:
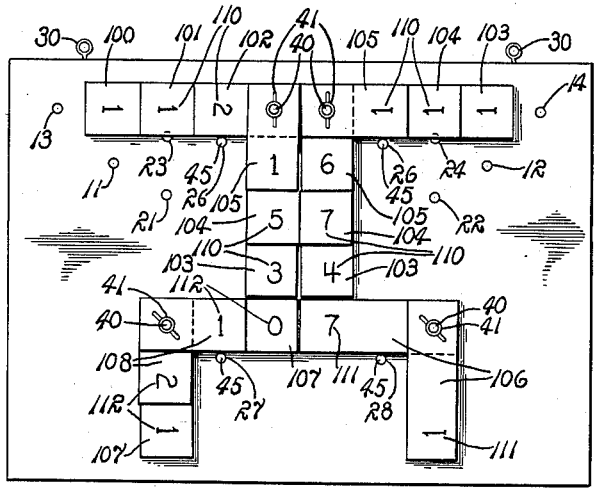

In Fig. 8, a still further illustrative employment of the device of the present invention is represented. Pivot pins are provided in bores 15 and 16 and pegs in bores 25 and 26, as explained in connection with Fig. 6. Additionally, pivot pins 40 are mounted in bores 17 and 18 and pegs 45 in bores 27 and 28. A plurality of books 100, 101 and 102 are pivotally mounted on the pin in the bore 15 and books 103, 104 and 105 on the pin in the bore 16. Initially, the books are supported on their respective pegs 25 and 26 in horizontal position. For the practice of arithmetic, each tablet of each of the books 100 to 105 is provided with a numeral 110 which is disposed in upright position when the tablets are pivoted from their respective pegs into pendant position. A single book 106 bearing numbers 111 readable when the tablets of the book are horizontally disposed is pivotally mounted on the pin in the bore 18. A pair, or greater number if desired, of books 107 and 108 are pivotally mounted on the pin in the bore 17 and provided with numerals 112 as the visual indicia thereon.

At the beginning of a learning exercise, the tablets of books 106, 107 and 108 are pendantly supported on their pins. The instructor selects tablets from the books 100 to 105 and pivots them to pendant position so as to provide a problem of addition in the manner shown. The pupil then adds the right hand column of figures presented on the books 103 to 105 and selects the tablet from the book 106 which represents the last digit of the sum of the numbers of the right hand column. This tablet is pivoted to horizontal position and rested on the peg 28 so that said last digit is represented below the right hand column of figures. The pupil then adds the left hand column with any digit which has been carried as a result of the addition of the right hand column and selects appropriate tablets from books 107 and 108 to complete the answer to the addition problem. These selected tablets are pivoted to horizontal position and rested on the peg in the bore 27.

It will be observed that the openings provided in the tablets for receipt of the pivot pins 40 are in corresponding end portions of the tablets and mid-way of the widths of the tablets. The pegs 45 are spaced downwardly from their respectively adjacent pins 40 so that the flats 46 thereof are distances from their pins substantially equal to the spacing of the openings in the cards from their side edges. All pegs are also spaced from their pins horizontal distances less than the length of the shortest tablets mounted on their respective pins.

*Operation*

The operation of the device of the present invention is believed to be clearly apparent and is only briefly reviewed at this point.

Although the various tablets described may be provided with the visual indicia already represented thereon, the tablets are more popularly provided in blank. This permits the instructor to provide visual indicia suited to his particular educational objective, student level, subject matter, or skill with which he is concerned. This is done by writing, drawing the indicia thereon or by pasting or otherwise affixing selected pictures or the like to the tablets. An exercise is usually predetermined by the instructor moving certain tablets from retracted to display position whereupon the pupil moves corresponding tablets from an adjacent book from retracted to display position. In certain instances, instructions are simply given orally and the student does all of the manipulating. For example, when the device is arranged as shown in Fig. 4, the instructor does nothing more than to specify the word for the pupil to spell whereupon all of the tablet selection and pivotal movement to display position is done by the pupil.

The device has also been found to be of advantage in self-teaching as well as student teaching, the physical manipulation involved in all instances being conductive to increased pupil interest and attention. The device is not limited to any particular knowledge, skill or educational level but obviously has particular advantage in the pre-primary or primary grades. It is economical to produce, convenient to use, and speedily adapted to widely varied requirements.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An educational device comprising a substantially erect base panel; a pivot pin mounted on the base panel in substantially normal relation thereto; a plurality of flat, substantially rectangular, congruent, tablet members having openings centrally of corresponding end portions thereof pendantly supported on the pivot pin by engagement of the pivot pin in the openings; and a support peg mounted on the base panel in substantially parallel relation to the pivot pin laterally adjacent and below said pin, the lateral spacing of the peg being less than the lengths of the tablet members and the vertical spacing of the peg being approximately one-half of the width of said tablet members from the pin whereby tablet members pivoted about the pin may be edgewardly rested on the peg in substantially horizontal position, the tablet members having visual indicia thereon displayed in upright position when their respective tablet members are in horizontal position.

2. An educational device comprising a substantially erect base panel; a pivot pin mounted on the base panel in substantially normal relation thereto; a plurality of books each consisting of a plurality of flat, substantially, rectangular, congruent tablet members having openings centrally of corresponding end portions thereof pendantly supported on the pivot pin by engagement thereof in the openings, the tablet members of each book being of substantially the same length and the tablet members of the different books being of the same width but of progressively shorter lengths outwardly from the base panel whereby the extended end portions of the tablet members of each book are viewable endwardly of the tablet members of all books outwardly from the base panel therefrom, said extended end portions having visual indicia thereon, there being such an indicia on a tablet member of each book which relates to a common learning exercise; and a support peg mounted on the base panel in substantially parallel relation to the pivot pin laterally adjacent and below said pin, the lateral spacing of the peg from the pin being less than the length of the tablet members of the shortest book and the elevational spacing of the peg from the pin being approximately one-half of the width of the tablet members whereby tablet members pivoted on the pin may be rested on the peg in substantially horizontal positions.

3. An educational device comprising a substantially erect flat panel, a plurality of pivot pins mounted on the panel and extended therefrom in substantially horizontally aligned predetermined adjacent spaced relation, substantially horizontally aligned pegs individually associated with the pins mounted on the panel horizontally and downwardly spaced from their respective pivot pins, and a plurality of substantially congruent tablet members pivotally mounted on each of the pins for movement between pendant positions and substantially horizontally disposed positions rested on the pegs associated with their respective pins with tablet members of adjacent pins being in adjacent substantially horizontal alignment, the tablet members each having visual indicia thereon of a character individual thereto, there being companion tablets on the different pins, said companion tablets relating to a single visual entity and the visual indicia of the companion tablets being differential integrants of said visual entity which is disorganized when the tablets are in one of their positions and restored by movement of the companion tablets to their other positions.

4. An educational device comprising a substantially erect flat panel, a pair of pivot pins mounted on the panel in horizontally spaced relation, a peg mounted on the panel in adjacent spaced relation to each of the pins and spaced downwardly and toward the opposite pin from its respective pin, a plurality of elongated congruent tablets pivotally mounted on each of the pins and pendantly supported thereon, the tablets being individually pivotal about their respective pins to substantially horizontal display positions rested on the adjacent pegs and being of such length that the tablets of the separate pins substantially meet when in display position, the tablet members each having visual indicia thereon of a character unique thereto, there being companion tablets on the separate pins relating to a single visual entity and the visual indicia of said companion tablets being differential integrants of said visual entity which is disorganized when the tablets are in pendant position and restored by movement of the companion tablets to their display positions, and means mounted on the pins releasably retaining the tablet members pivotally mounted thereon.

5. An educational device comprising a substantially flat panel, a plurality of pivot pins mounted on the panel and extended therefrom in predetermined adjacent spaced relation, and a plurality of books of tablet members having peripheral edges pivotally mounted on each of the pins for movement between predetermined display positions in adjacent edgewardly facing relation to books on adjacent pins and positions retracted from the display positions, one of said positions being substantially vertical and the other of said positions being upwardly angulated with respect to a vertical, the tablet members of the various books being substantially rectangular and of a common width, the tablet members of each book being substantially congruent, the books on each pin being in stacked relation and progressively of shorter length outwardly from the panel whereby end portions of the tablet members of each book are visible, the end portions of the tablet members within each book having visual indicia thereon of a character individual thereto, there being companion tablet members in the different books relating to a single visual representation and the visual indicia of the individual companion tablet members being divisible fractional portions of said visual representation, which representation is disorganized when its tablet members are in retracted positions and restored by selection and movement of its tablet members to their respective display positions, and means on the panel supporting the tablet members in their upwardly angulated positions.

6. An educational device comprising a substantially erect base panel; a pivot pin mounted on the base panel and outwardly extended therefrom; a plurality of tablet members of predetermined lengths and widths pivotally supported in pendant positions on the pivot pin; and a support peg mounted on the base panel and outwardly extended therefrom laterally adjacent and below said pin, the lateral spacing of the peg being less than the lengths of the tablet members and the vertical spacing of the peg from the pin being approximately one-half of the width of said tablet members whereby tablet members pivoted about the pin may be edgewardly rested on the peg in substantially horizontal position, the tablet members having visual indicia thereon displayed in upright position when their respective tablet members are in a predetermined one of said pendant and horizontal positions.

7. An educational device comprising a substantially erect base panel; a pivot pin mounted on the base panel and outwardly extended therefrom; a plurality of tablet members having opposite side edges pivotally supported in pendant positions on the pivot pin; and a support peg mounted on the base panel and outwardly extended therefrom below said pin and laterally adjacent to one of the side edges of the tablet members pendantly supported on the base panel, the tablet members being supported on the pin at positions therein in predetermined spaced relation between the opposite side edges of the tablet members and the peg being spaced below the pin a distance substantially equal to the spacing of the support positions of the tablet members from the side edges of said members opposite to the peg when the tablet members are in pendant position whereby the tablet members may be rested on the peg in substantially horizontal position; the tablet members having visual indicia thereon displayed in upright position in one of said positions of the tablet members.

8. An educational device comprising a substantially erect base panel; a pivot pin mounted on the base panel and outwardly extended therefrom; a plurality of books each including a plurality of flat, substantially rectangular congruent tablet members pivotally pendantly supported on the pivot pin, the tablet members of each book being of substantially the same length and the tablet members of the different books being of the same width but of progressively shorter lengths outwardly of the base panel whereby the extended end portions of the tablet members of each book are viewable endwardly of the tablet members of all books outwardly of the base panel therefrom, said extended end portions having visual indicia thereon, there being such an indicia on a tablet member of each book which relates to a common learning exercise; a support peg mounted on the base panel outwardly extended therefrom laterally adjacent and below said pin, the lateral spacing of the peg from the pin being less than the length of the tablet members of the shortest book and the elevational spacing of the peg from the pin being approximately one-half of the width of the tablet members whereby tablet members pivoted on the pin may be rested on the peg in substantially horizontal positions.

9. An educational device comprising a substantially erect panel, a plurality of books of elongated congruent tablets, means pivotally mounting the books on the panel for movement between pendant positions and substantially horizontal positions, and means engageable with the tablet members supporting the books in said horizontal positions, the tablets being of such length that the tablets of the separate mounting means substantially meet in horizontal position, the tablet members each having visual indicia thereon of a character unique thereto, there being companion tablets on the separate mounting means relating to a single visual entity and the visual indicia of said companion tablets being differential integrants of said visual entity which is disorganized when the tablets are in pendant position and restored by movement of the companion tablets to their horizontal positions.

References Cited in the file of this patent

UNITED STATES PATENTS

| | | |
|---|---|---|
| D. 173,363 | Louis | Nov. 2, 1954 |
| 385,046 | Dushane | June 26, 1888 |
| 629,891 | Cunningham | Aug. 1, 1899 |
| 1,279,504 | Blau | Sept. 24, 1918 |
| 1,445,819 | Boyle | Feb. 20, 1923 |
| 1,450,395 | Troidl | Apr. 3, 1923 |
| 1,602,069 | D'Ordine | Oct. 5, 1926 |
| 2,232,732 | Rogers | Feb. 25, 1941 |

FOREIGN PATENTS

| | | |
|---|---|---|
| 363,158 | France | Apr. 26, 1906 |
| 759,024 | France | Nov. 7, 1933 |
| 5,489 | Great Britain | Mar. 6, 1909 |
| 165,862 | Switzerland | Feb. 16, 1934 |